United States Patent
Yao et al.

(10) Patent No.: US 10,582,448 B2
(45) Date of Patent: Mar. 3, 2020

(54) METHOD FOR SELECTING AVAILABLE ACCESS NETWORK AND USER EQUIPMENT

(71) Applicant: ZTE CORPORATION, Shenzhen, Guangdong Province (CN)

(72) Inventors: Jun Yao, Shenzhen (CN); Qian Dai, Shenzhen (CN); Yunpeng Cui, Shenzhen (CN); Ting Lu, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 464 days.

(21) Appl. No.: 14/889,938

(22) PCT Filed: Mar. 24, 2014

(86) PCT No.: PCT/CN2014/073955
§ 371 (c)(1),
(2) Date: Dec. 10, 2015

(87) PCT Pub. No.: WO2014/180190
PCT Pub. Date: Nov. 13, 2014

(65) Prior Publication Data
US 2016/0127988 A1    May 5, 2016

(30) Foreign Application Priority Data
May 9, 2013 (CN) .......................... 2013 1 0169199

(51) Int. Cl.
*H04W 48/20* (2009.01)
*H04W 48/18* (2009.01)
(Continued)

(52) U.S. Cl.
CPC .......... *H04W 48/20* (2013.01); *H04W 24/10* (2013.01); *H04W 48/18* (2013.01); *H04W 84/12* (2013.01)

(58) Field of Classification Search
CPC ..... H04W 48/20; H04W 24/10; H04W 48/18; H04W 84/12
See application file for complete search history.

(56) References Cited

U.S. PATENT DOCUMENTS 9,042,361 B2 * 5/2015 Makhlouf ............. H04W 72/02
370/338
2003/0139197 A1 * 7/2003 Kostic ..................... H04L 47/10
455/525

(Continued)

FOREIGN PATENT DOCUMENTS

CN    1479491 A    3/2004
CN    101491144 A    7/2009
(Continued)

OTHER PUBLICATIONS

International Search Report and Written Opinion dated Jun. 10, 2014 in PCT Application No. PCT/CN2014/073955.
(Continued)

*Primary Examiner* — Siming Liu
(74) *Attorney, Agent, or Firm* — Cantor Colburn LLP

(57) ABSTRACT

Disclosed are a method for selecting an available access network and a user equipment, wherein the method includes: when monitoring that a state of a wireless local area network access network consistently meets a predetermined threshold for a predetermined time period and/or a predetermined number of times, or monitoring that the state of the wireless local area network access network within the predetermined time period or for the predetermined number of times meets the predetermined threshold after filtering processing, a user
(Continued)

equipment determining the wireless local area network access network as an available access network.

20 Claims, 3 Drawing Sheets

(51) Int. Cl.
*H04W 24/10* (2009.01)
*H04W 84/12* (2009.01)

(56) References Cited

U.S. PATENT DOCUMENTS

| | | | | |
|---|---|---|---|---|
| 2003/0207699 A1* | 11/2003 | Shpak | H04W 48/20 | 455/525 |
| 2004/0044887 A1* | 3/2004 | Park | H04W 36/30 | 713/1 |
| 2005/0143068 A1* | 6/2005 | Ben-Yehuda | H04W 36/30 | 455/434 |
| 2006/0050742 A1* | 3/2006 | Grandhi | H04B 7/0413 | 370/506 |
| 2007/0010248 A1* | 1/2007 | Dravida | H04W 60/00 | 455/435.1 |
| 2007/0091864 A1 | 4/2007 | Honjo et al. | | |
| 2008/0014934 A1 | 1/2008 | Balasubramanian et al. | | |
| 2008/0075033 A1* | 3/2008 | Shattil | H04B 7/026 | 370/328 |
| 2008/0096575 A1* | 4/2008 | Aragon | H04W 36/22 | 455/453 |
| 2009/0286510 A1* | 11/2009 | Huber | G06Q 20/1235 | 455/410 |
| 2010/0172254 A1* | 7/2010 | Sachs | H04W 48/18 | 370/252 |
| 2010/0323663 A1* | 12/2010 | Vikberg | H04J 11/0093 | 455/410 |
| 2011/0110521 A1* | 5/2011 | Yang | H04W 48/20 | 380/270 |
| 2011/0111759 A1* | 5/2011 | Chami | H04W 48/20 | 455/436 |
| 2011/0122805 A1* | 5/2011 | Abraham | H04W 72/1215 | 370/312 |
| 2011/0299422 A1* | 12/2011 | Kim | H04W 48/16 | 370/253 |
| 2012/0023189 A1* | 1/2012 | Giaretta | H04W 48/18 | 709/217 |
| 2012/0039226 A1* | 2/2012 | Yang | H04W 52/0277 | 370/311 |
| 2012/0164979 A1* | 6/2012 | Bachmann | H04L 63/164 | 455/411 |
| 2012/0196644 A1* | 8/2012 | Scherzer | H04W 48/18 | 455/524 |
| 2012/0322450 A1* | 12/2012 | Karaoguz | H04L 12/4625 | 455/436 |
| 2013/0031271 A1* | 1/2013 | Bosch | H04W 40/36 | 709/245 |
| 2013/0042316 A1* | 2/2013 | Lappetelainen | H04W 12/04 | 726/10 |
| 2013/0088983 A1* | 4/2013 | Pragada | H04W 16/14 | 370/252 |
| 2013/0094371 A1* | 4/2013 | Vallath | H04W 76/18 | 370/252 |
| 2013/0103502 A1* | 4/2013 | Mildh | G06Q 30/0267 | 705/14.61 |
| 2013/0107757 A1* | 5/2013 | Cherian | H04W 48/16 | 370/255 |
| 2013/0107788 A1* | 5/2013 | Cherian | H04W 72/005 | 370/312 |
| 2013/0107824 A1* | 5/2013 | Cherian | H04W 76/11 | 370/329 |
| 2013/0107825 A1* | 5/2013 | Cherian | H04W 76/11 | 370/329 |
| 2013/0111044 A1* | 5/2013 | Cherian | H04W 76/10 | 709/228 |
| 2013/0128831 A1* | 5/2013 | Calcev | H04W 72/042 | 370/329 |
| 2013/0242897 A1* | 9/2013 | Meylan | H04W 28/16 | 370/329 |
| 2013/0265997 A1* | 10/2013 | Gu | H04W 36/0022 | 370/338 |
| 2013/0336240 A1* | 12/2013 | Cherian | H04W 12/06 | 370/329 |
| 2014/0051393 A1* | 2/2014 | Mildh | H04W 76/10 | 455/411 |
| 2014/0112320 A1* | 4/2014 | Makhlouf | H04W 72/02 | 370/338 |
| 2014/0204927 A1* | 7/2014 | Horn | H04W 76/16 | 370/338 |
| 2014/0307551 A1* | 10/2014 | Forssell | H04W 48/16 | 370/235 |
| 2015/0327139 A1* | 11/2015 | Sirotkin | H04W 76/20 | 370/332 |

FOREIGN PATENT DOCUMENTS

| | | |
|---|---|---|
| CN | 101932014 A | 12/2010 |
| EP | 1395077 A1 | 3/2004 |
| JP | 2004096707 A | 3/2004 |
| JP | 2007110373 A | 4/2007 |
| JP | 2009544245 A | 12/2009 |
| JP | 2011217225 A | 10/2011 |
| JP | 2012004659 A | 1/2012 |
| JP | 2013021653 A | 1/2013 |
| WO | 2008008987 A2 | 1/2008 |
| WO | WO2008008987 * | 1/2008 |
| WO | WO2008008987 A2 * | 1/2008 |
| WO | 2013/049060 A1 | 4/2013 |

OTHER PUBLICATIONS

European Search Report dated May 2, 2016 in European Patent Application No. EP14794016.7.
Japanese Office Action dated Oct. 25, 2016 in Japanese Patent Application No. 2016-512201.
Office Action dated May 2, 2018 for Chinese Patent Application No. 201310169199.6 and the English translation.
Office Action dated Jun. 6, 2017 for Japanese Patent Application No. 2016-512201.

\* cited by examiner

METHOD FOR SELECTING AVAILABLE ACCESS NETWORK AND USER EQUIPMENT

CROSS-REFERENCE TO RELATED APPLICATION(S)

This application is the U.S. National Phase application of PCT application number PCT/CN2014/073955 having a PCT filing date of Mar. 24, 2014, which claims priority of Chinese patent application 201310169199.6 filed on May 9, 2013, the disclosures of which are hereby incorporated by reference.

TECHNICAL FIELD

The present document relates to the field of communications, and more particularly, to a method for selecting an available access network and a user equipment.

BACKGROUND OF RELATED ART

With the constant evolution of wireless communications technologies and standards, mobile packet services have been tremendously developed, the data throughput capability of a single User Equipment (referred to as UE) is constantly upgrading. Take the Long Term Evolution (referred to as LTE) system for example, a maximum downlink rate of 100 Mbps data transmission is supported within a 20M bandwidth, and the data transmission rate has been increased, even up to 1 Gbps in the subsequent LTE Advanced system.

The inflatable growth of UE data services makes the related network resources gradually powerless, especially in the case that the new generation of communication technologies (such as, the third-generation mobile communication technology (3G), Long Term Evolution (LTE)) has not yet been extensively networking, and what followed is that the user rate and traffic requirements cannot be met, and the user experience is degraded. The operators must consider how to prevent and change this situation; on the one hand, the promotion and network deployment of new technologies should be accelerated; on the other hand, it is desirable to rapidly improve the network performance by enhancing the related networks and technologies. As well known, except of the wireless network technology provided in the Third Generation Partnership Project (referred to as 3GPP), the current widely applied Wireless Local Area Network (referred to as WLAN), particularly the wireless local area network based on the IEEE802.11 standard, has been widely used in hotspot coverage in homes, enterprises and even the Internet. Wherein, the technical specifications proposed by the Wi-Fi Alliance are applied most widely, therefore in practice the WIFI network is often equated to the WLAN network based on the IEEE 802.11 standard, and in the case of no confusion, the WIFI module is also adopted in the following to describe the wireless transceiver and processing module supporting the WLAN in network nodes.

In this context, some operators and companies have proposed to integrate the WLAN with the relevant 3GPP access network to achieve joint transmission, and to use the WLAN network to achieve the purposes of balancing offload and improving network performance of the relevant 3GPP access network. At present the 3GPP has now developed protocol for 3GPP access network and WLAN Interworking, as shown in FIG. 1, the current 3GPP Interworking WLAN architecture allows the WLAN network using the Authentication Authorization Accounting (referred to as AAA) server in the 3GPP access network for unified authentication and authorization, and can multiplex the packet data network gateway in the relevant 3GPP access network as the packet data gateway in the WLAN network, while also can achieve a unified accounting and charging of two networks, so as to reach a loose coupling of the two networks.

But the current Interworking architecture still has some shortcomings, for example, the current Interworking is triggered by the UE, and the 3GPP network side has no control over the target access network, although the Access Network Discovery Support Function (referred to as ANDSF) at the core network side will give some strategic rules, but these rules are relatively static, the 3GPP network side lost the control on the UE selecting an access network, which may result in that the access network selected by the UE cannot meet the UE's QoS (Quality of Service) requirement, or result in that the UE performs frequent handover between the 3GPP access network and the WLAN access network, thus affecting the user experience and also adding unnecessary burden on the network.

SUMMARY OF THE INVENTION

The embodiment of the present invention provides a method for selecting an available access network and a user equipment, to solve the problem that the UE frequently performs selections between the 3GPP access network and the WLAN access network in the related art.

The embodiment of the present invention provides a method for selecting an available access network, comprising:

when monitoring that a state of a wireless local area network access network consistently meets a predetermined threshold for a predetermined time period and/or a predetermined number of times, or monitoring that a state of the wireless local area network access network within the predetermined time period or for the predetermined number of times meets the predetermined threshold after filtering processing, a user equipment determining the wireless local area network access network as an available access network Alternatively, the abovementioned method further has the following feature:

the user equipment monitoring that a state of a wireless local area network access network consistently meets a predetermined threshold for a predetermined time period and/or a predetermined number of times comprises:

the user equipment monitoring that one or more states of the wireless local area network access network separately and consistently meet the predetermined threshold for the predetermined time period and/or the predetermined number of times, or a plurality of states of the wireless local area network access network consistently meet the predetermined threshold after weighting processing for the predetermined time period and/or the predetermined number of times, or any one state of the plurality of states consistently meets the predetermined threshold for the predetermined time period and/or the predetermined number of times.

Alternatively, the abovementioned method further has the following feature: the user equipment monitoring that a state of the wireless local area network access network within the predetermined time period or for the predetermined number of times meets the predetermined threshold after filtering processing comprises:

the user equipment monitoring that an average value of the state of the wireless local area network access network within a plurality of time segments of the predetermined time period meets the predetermined threshold after the weighting processing;

or, the user equipment monitoring that an average value of the state of the wireless local area network access network within consecutive time segments of a predetermined number of times meets the predetermined threshold after the weighting processing;

or, the user equipment monitoring that the state of the wireless local area network access network for a predetermined number of consecutive times meets the predetermined threshold after the weighting processing.

Alternatively, the abovementioned method further has the following feature:

the user equipment monitoring that a state of the wireless local area network access network within the predetermined time period or the predetermined number of times meets the predetermined threshold after filtering processing comprises:

the user equipment monitoring that a plurality of states of the wireless local area network access network within the predetermined time period or for the predetermined number of times respectively meet the predetermined threshold after the filtering processing, or meet the predetermined threshold after the filtering processing and then weighting processing, or any one state of the plurality of states meets the predetermined threshold after the filtering process.

Alternatively, the abovementioned method further has the following feature: the state of the wireless local area network access network comprises one or more of the following:

signal strength of the wireless local area network access network;

a ratio of received signal strength of the wireless local area network access network to transmit signal strength of the wireless local area network access point;

a signal to interference and noise ratio (SINR) of signals in the wireless local area network access network;

an access network load of the wireless local area network access network;

an uplink load of a link connecting the wireless local area network access network to a wide area network; and a downlink load of the link connecting the wireless local area network access network to the wide area network.

Alternatively, the abovementioned method further has the following feature:

the user equipment obtains the signal strength of the wireless local area network access network by measuring a beacon frame or a measurement pilot frame, or by a replied beacon report or link measurement report obtained after sending a beacon request or a link measurement request to a wireless local area network site;

the user equipment obtains the ratio of the received signal strength of the wireless local area network access network to the transmit signal strength of the wireless local area network access point by monitoring the beacon frame or a probe response frame, and the known signal strength of the wireless local area network access network;

the user equipment obtains the signal to interference and noise ratio (SINR) of signals in the wireless local area network access network by measuring the beacon frame or the measurement pilot frame, or a replied link measurement report obtained after sending a link measurement request to the wireless local area network site, or a replied noise histogram report obtained after sending a noise histogram request to the wireless local area network site, and the known signal strength of the wireless local area network access network;

the user equipment obtains the access network load of the wireless local area network access network by monitoring the beacon frame or the probe response frame, or by a replied channel load report obtained after sending a channel load request to the wireless local area network site; and the user equipment obtains the uplink load of the link connecting the wireless local area network access network to the wide area network and the downlink load of the link connecting the wireless local area network access network to the wide area network by monitoring the beacon frame or the probe response frame.

Alternatively, the abovementioned method further has the following feature:

the predetermined threshold is configured by a network side via broadcasting or paging or a dedicated signaling, or is configured by the user equipment itself in accordance with a protocol specification.

Alternatively, the abovementioned method further has the following feature:

the predetermined time period is configured by the network side via broadcasting or paging or a dedicated signaling, or is configured by the user equipment itself in accordance with a protocol specification.

Alternatively, the abovementioned method further has the following feature:

the predetermined number of times is configured by the network side via broadcasting or paging or dedicated signaling, or is configured by the user equipment itself in accordance with a protocol specification.

Alternatively, the abovementioned method further has the following feature:

a filtering coefficient of the filtering processing is configured by the network side via broadcasting or paging or a dedicated signaling, or is configured by the user equipment itself in accordance with a protocol specification.

Alternatively, the abovementioned method further has the following feature:

a weighting coefficient of the weighting processing is configured by the network side via broadcasting or paging or a dedicated signaling, or is configured by the user equipment itself in accordance with a protocol specification.

The embodiment of the present invention further provides a user equipment, comprising:

a monitoring module, configured to monitor whether a state of a wireless local area network access network consistently meets a predetermined threshold for a predetermined time period and/or a predetermined number of times, or monitor whether a state of the wireless local area network access network within the predetermined time period or for the predetermined number of times meets the predetermined threshold after filtering processing; and a judging module, configured to determine the wireless local area network access network as an available access network in the case that the monitoring module monitors that a predetermined condition is met.

Alternatively, the abovementioned user equipment further has the following feature:

the monitoring module monitors whether the state of the wireless local area network access network meets a predetermined threshold for a predetermined time period and/or a predetermined number of times in the following way: monitoring whether one or more states of the wireless local area network access network respectively and consistently meet the predetermined threshold for the predetermined time period and/or the predetermined number of times, or whether a plurality of states of the wireless local area network access network consistently meet the predetermined threshold for the predetermined time period and/or the predetermined number of times after weighting processing, or whether any one state of the plurality of states consistently meets the predetermined threshold for the predetermined time period and/or the predetermined number of times.

Alternatively, the abovementioned user equipment further has the following feature:

the monitoring module monitors whether a state of the wireless local area network access network within the predetermined time period or the predetermined number of times meets the predetermined threshold after filtering processing in the following way: monitoring whether an average value of the state of the wireless local area network access network within a plurality of time segments of the predetermined time period meets the predetermined threshold after the weighting processing; or, monitoring whether an average value of the state of the wireless local area network access network within consecutive time segments of the predetermined number of times meets the predetermined threshold after the weighting processing; or, monitoring whether the state of the wireless local area network access network for predetermined number of consecutive times meets the predetermined threshold after the weighting processing.

Alternatively, the abovementioned user equipment further has the following feature:

the monitoring module monitors whether a state of the wireless local area network access network within the predetermined time period or for the predetermined number of times meets the predetermined threshold after filtering processing in the following way: monitoring whether a plurality of states of the wireless local area network access network within the predetermined time period or for the predetermined number of times respectively meet the predetermined threshold after the filtering processing, or meet the predetermined threshold after the filtering processing and then weighting processing, or whether any one state of the plurality of states meets the predetermined threshold after the filtering processing.

Alternatively, the abovementioned user equipment further has the following feature: the state of the wireless local area network access network monitored by the monitoring module comprises one or more of the following:

signal strength of the wireless local area network access network;

a ratio of a received signal strength of the wireless local area network access network to a transmit signal strength of the wireless local area network access point;

a signal to interference and noise ratio (SINR) of signals in the wireless local area network access network;

an access network load of the wireless local area network access network;

an uplink load of a link connecting the wireless local area network access network to a wide area network; and a downlink load of the link connecting the wireless local area network access network to the wide area network.

Alternatively, the abovementioned user equipment further has the following feature:

the monitoring module monitors the state of the wireless local area network access network in one or more of the following ways:

obtaining the signal strength of the wireless local area network access network by measuring a beacon frame or a measurement pilot frame, or by a replied beacon report or link measurement report obtained after sending a beacon request or a link measurement request to a wireless local area network site;

obtaining the ratio of the received signal strength of the wireless local area network access network to the transmit signal strength of the wireless local area network access point by monitoring the beacon frame or a probe response frame, and the known signal strength of the wireless local area network access network;

obtaining the signal to interference and noise ratio (SINR) of signals in the wireless local area network access network by measuring the beacon frame or the measurement pilot frame, or a replied link measurement report obtained after sending a link measurement request to the wireless local area network site, or a replied noise histogram report obtained after sending a noise histogram request to the wireless local area network website, and the known signal strength of the wireless local area network access network;

obtaining the access network load of the wireless local area network access network by monitoring the beacon frame or the probe response frame, or by a replied channel load report obtained after sending a channel load request to the wireless local area network site; and obtaining the uplink load of the link connecting the wireless local area network access network to the wide area network and the downlink load of the link connecting the wireless local area network access network to the wide area network by monitoring the beacon frame or the probe response frame.

Alternatively, the abovementioned user equipment further has the following feature:

the user equipment further comprises, a configuring module, configured to accept the predetermined threshold, the predetermined time period, the predetermined number of times, a filtering coefficient of the filtering processing and a weighting coefficient of the weighting processing set by the network side set via broadcasting or paging or a dedicated signaling, or set by the configuring module itself in accordance with a protocol specification.

In summary, the embodiment of the present invention provides a method for selecting an available access network and a user equipment to ensure that the UE can select a stable wireless local area network access network, thus reducing the risk of possible ping-pong selection.

BRIEF DESCRIPTION OF THE DRAWINGS

The accompanying drawings described herein are used to provide an understanding of the embodiments of the present invention and constitutes a part of the present application, the exemplary embodiments of the present invention and their illustrations are used to explain the patent document, and do not constitute an undue limitation to the patent document. In the accompanying drawings.

PREFERRED EMBODIMENTS OF THE INVENTION

Hereinafter in conjunction with the accompanying drawings, the embodiments of the present invention will be described in detail. It should be noted that, in the case of no conflict, embodiments and features in the embodiments of the present application may be arbitrarily combined with each other.

Figure 1:
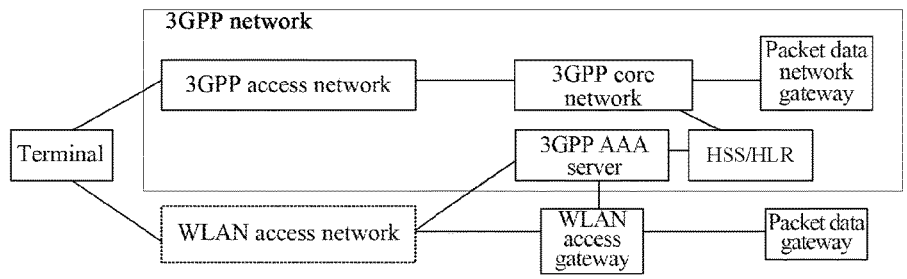
FIG. 1 is a schematic diagram of the architecture of a network interworking protocol in the related art.
Figure 2:
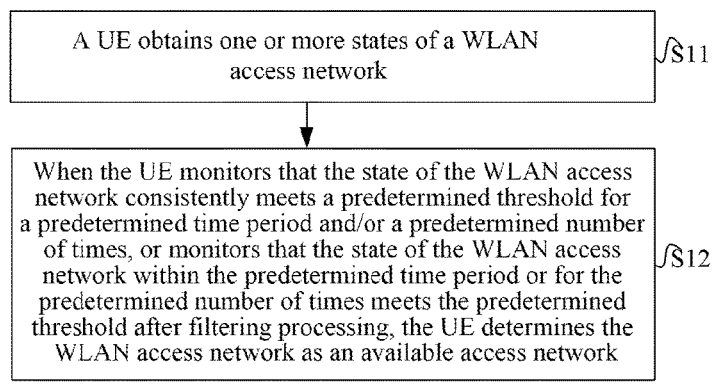
FIG. 2 is a flow chart of a method for selecting an available access network in accordance with an embodiment of the present invention.

FIG. 2 is a flow chart of the method for selecting an available access network in accordance with an embodiment of the present invention, and as shown in FIG. 2, the method of the present embodiment comprises the following steps:

In step S11, the UE obtains one or more states of the WLAN access network;

In step S12, when the UE monitors that the state of the WLAN access network consistently meets a predetermined threshold for a predetermined time period and/or a predetermined number of times, or monitors that the state of the WLAN access network within the predetermined time period or for the predetermined number of times meets the predetermined threshold after filtering processing, the UE determines the WLAN access network as an available access network.

In one preferred embodiment, the UE obtains multiple states of the WLAN access network and when the user equipment monitors that one or more states of the WLAN access network respectively and consistently meet the predetermined threshold, or multiple states of the WLAN access network consistently meet the threshold after weighting processing, or any one state of the multiple states consistently meets the predetermined threshold for the predetermined time period and/or the predetermined number of times, the UE determines the WLAN access network as an available access network.

In a preferred embodiment, when the UE monitors that the average value of the state of the WLAN access network within a plurality of time segments of the predetermined time period meets the predetermined threshold after the weighting processing; or, the UE monitors that the average value of the state of the WLAN access network within consecutive time segments of the predetermined number of times meets the predetermined threshold for after the weighting processing; or, the UE monitors that the state of the WLAN access network for the predetermined number of consecutive times meets the predetermined threshold after the weighting processing, the UE determines the WLAN access network as an available access network.

In a preferred embodiment, the UE obtains multiple states of the WLAN access network and when the UE monitors that the states of the WLAN access network within the predetermined time period or for the predetermined number of times respectively meet the predetermined threshold after the filtering processing or after the filtering process and then the weighting processing, or any one state of the multiple states meets the predetermined threshold, the UE determines the WLAN access network as an available access network.

Wherein, the state of the WLAN access network comprises one or more of the following:
signal strength of the WLAN access network;
a ratio of the received signal strength of the WLAN access network to the transmit signal strength of the WLAN access point;
a signal to interference and noise ratio (SINR) of signals in the WLAN access network;
access network load of the WLAN access network;
uplink load of a link connecting the WLAN access network to a wide area network; and
downlink load of the link connecting the WLAN access network to the wide area network.

Wherein, the predetermined threshold is configured by the network side via broadcasting or paging or a dedicated signaling, or is configured by the user equipment itself in accordance with the protocol specification.

The predetermined time period is configured by the network side via broadcasting or paging or the dedicated signaling, or is configured by the user equipment itself in accordance with the protocol specification.

The predetermined number of times is configured by the network side via broadcasting or paging or the dedicated signaling, or is configured by the user equipment itself in accordance with the protocol specification.

A weighting coefficient of the weighting processing is configured by the network side via broadcasting or paging or dedicated signaling, or is configured by the user equipment itself in accordance with the protocol specification.

A filtering coefficient of the filtering processing is configured by the network side via broadcasting or paging or the dedicated signaling, or is configured by the user equipment itself in accordance with the protocol specification.

Therefore, the method in accordance with the embodiments of the present invention can ensure that the UE selects a stable WLAN access network, thus reducing the risk of possible ping-pong selection.

In the following, several specific embodiments are provided to describe the method of the patent document in detail.

The First Embodiment

FIG. 2 is a specific flow chart of the first embodiment of the present invention.

In step S201, the core network node (CN Node 204) sends a core network policy and auxiliary information to the user equipment (UE 200);

A typical core network node in the present embodiment is the ANDSF, or a Mobility Management Entity (referred to as MME), or a Public Data Network Gateway (referred to as P-GW), or a Serving Gateway (referred to as S-GW), and other nodes. The CN Node 204 may actively or passively provide the UE 200 with some policies recommended by the operator as well as the related access network information which can assist the UE 200 in performing better network selection.

Take the ANDSF for example, the ANDSF can provide the UE 200 with an Inter-System Mobility Policy (referred to as ISMP), Access Network Discovery Information and an Inter-System Routing Policy (referred to as ISRP).

Wherein, the ISMP comprises: priorities of different radio access technologies, as well as priorities of different wireless access networks of the same radio access technology, as well as some restriction information, for example, the contents of which time period that the handover is performed from one wireless access technology to another wireless access technology is not allowed or the handover is performed from one wireless access technology to another wireless access technology is always not allowed, and so on.

The access network discovery information comprises which wireless access networks may be near the UE, and it comprises information such as identifications and locations of the wireless access networks.

The ISRP comprises the contents that, when the UE can simultaneously connect to two wireless access technologies, what IP flows or Public Data Network (PDN) connections preferably using which wireless access technology, and what IP flows or PDN connections being not allowed to use which wireless access technology, and so on.

In step S203, the access network node (RAN Node 202) sends the (access network (RAN) auxiliary information to the UE 200;

The typical access network node in the present embodiment is the evolved node B (eNB), node B (NB), radio network controller (referred to as RNC), base transceiver station (referred to as BTS), and base station controller (referred to as BSC).

The RAN Node 202 periodically or aperiodicity provides the UE 200 with some auxiliary information, such as the load information of the current RAN. Take the eNB for example, the eNB can add the load information of the RAN as well as the load of the link connecting the RAN to the core network into the broadcasting or paging message. The specific load information can be indicated by means of the resource usage percentage, cell throughput, link rate, or load level.

In step S205, the UE 200 initiates a WLAN scanning and obtains WLAN status parameters;

If the UE decides, that currently a part of the services can be distributed to the WLAN network to obtain better user experience or to alleviate the burden on the RAN side or to comply with the policy established by the operator according to the auxiliary information and policies provided by the RAN and the CN (Core Network), the UE may initiate a flow of a WLAN scanning and/or WLAN state parameters obtaining.

The UE can scan different channels to detect the beacon frame pseudo-periodically broadcasted by the WLAN access point (referred to as AP), and the Beacon frame carries an identification of the WLAN network, and the UE decides which WLANs are nearby by monitoring the Beacon frame.

The UE may obtain signal strength of the WLAN access network by measuring the Beacon frame or the Measurement Pilot Frame, specifically measuring the received signal strength indication (referred to as RSSI), or the received channel power indicator (referred to as RCPI).

The UE can obtain the transmit signal strength of the WLAN access point by monitoring the beacon frame or the probe response frame, specifically it can obtain the transmit signal strength through the Transmit Power Control report element (TPC Report element) in the Beacon frame or the Probe Response Frame, and uses the known signal strength of the WLAN access network and the transmit signal strength of the WLAN access point (referred to as AP) to obtain the ratio of the received signal strength of the wireless local area network access network to the transmit signal strength of the WLAN access point;

The UE can obtain the signal to interference plus noise ratio (SINR) of signals in the WLAN access network by measuring the Beacon frame or the Measurement Pilot frame, and specifically, it can measure the RSSI or RCPI, and the Average Noise Power Indicator (referred to as ANPI) to calculate the Received Signal to Noise Indicator (referred to as RSNI).

The UE can obtain the access network load of the WLAN access network and the uplink and/or downlink load of the link connecting the WLAN access network to the WAN by monitoring the Beacon frame or the Probe Response Frame, specifically, by monitoring the basic service set (BSS) Load element in the Beacon frame or the Probe Response frame, specifically by monitoring the WAN Metrics element in the Beacon frame or the Probe Response frame.

The UE sends a Beacon Request or a Link Measurement Request to another WLAN station (referred to STA) if the UE obtains a Beacon Report or a Link Measurement Report replied by the other STA, then it can obtain the signal strength of the WLAN access network.

The UE sends a Link Measurement Request to another STA, if the UE obtains a Link Measurement Report replied by the other STA, then it can obtain the SINR of signals in the WLAN access network, the UE sends a noise histogram request to another STA, if the UE obtain a Noise Histogram Report, and the UE can obtain the SINR of signals in the WLAN access network through the calculation according to the signal strength of the WLAN access network mastered by itself.

The UE sends a Channel load Request to another STA, if the UE obtains a channel load report replied by the other STA, then it can obtain the access network load of the WLAN access network.

In step S207, the UE 200 determines an available access network list, selects the best WLAN access network, or an available WLAN network which is monitored firstly;

To reduce the frequent handover between the WLAN and the 3gpp, it must ensure that the WLAN access network selected by the UE is stable, the UE needs to obtain one or more state parameters of different WLAN networks and screen them according to the step S205, determine the available access network list, and select the best access network from it.

The terminal equipment manufacturers can preset the predetermined threshold and/or the predetermined time period and/or the predetermined number of times inside the UE during the production of equipment in accordance with industry standards or protocol specifications. When the UE needs to perform the interworking of the 3gpp and the WLAN network and determine the available access network, and when the WLAN network state parameters must meet the preset values and preset conditions, the WLAN network can be just determined as an available network. The preset condition can be any one or combination of the following:

when the signal strength of the WLAN access network is consistently higher than or not less than the predetermined threshold for the predetermined time period;

when the signal strength of the WLAN access network is consistently higher than or not less than the predetermined threshold for the predetermined number of times;

when the ratio of the received signal strength of the WLAN access network to the transmit signal strength of the WLAN access point is consistently higher than or not less than the predetermined threshold for the predetermined time period;

when the ratio of the received signal strength of the WLAN access network to the transmit signal strength of the WLAN access point is consistently higher than or not less than the predetermined threshold for the predetermined number of times;

when the signal to interference and noise ratio of the signals in the WLAN access network is consistently higher than or not less than the predetermined threshold for the predetermined time period;

when the signal to interference and noise ratio of the signals in the WLAN access network is consistently higher than or not less than the predetermined threshold for the predetermined number of times;

when the access network load of the WLAN access network is consistently less than or not greater than the predetermined threshold for the predetermined time period;

when the access network load of the WLAN access network is consistently less than or not greater than the predetermined threshold for the predetermined number of times;

when the uplink load of the link connecting the WLAN access network to the WAN is less than or not greater than the predetermined threshold for the predetermined time period;

when the uplink load of the link connecting the WLAN access network to the WAN is less than or not greater than the predetermined threshold for the predetermined number of times;

when the downlink load of the link connecting the WLAN access network to the WAN is less than or not greater than the predetermined threshold for the predetermined time period;

when the downlink load of the link connecting the WLAN access network to the WAN is less than or not greater than the predetermined threshold for the predetermined number of times;

when monitoring that the signal strength of the WLAN access network within the predetermined time period or for the predetermined number of times is higher than or not less than the predetermined threshold after the filtering processing specifically comprises the following three:

1) when the average value of the signal strength of the WLAN access network within a plurality of time segments of the predetermined time period is higher than or not less than the predetermined threshold after the filtering process.

For example, the average signal strength of the Probe Response measured by the UE within the first time segment of the predetermined time period is S1, the average signal strength of the Probe Response measured by the UE within the second time segment of the predetermined time period is S2, the predetermined threshold is Threshold1, and k multiplied by S1 plus (1−k) multiplied by S2 is greater than Threshold1, where k is the filtering coefficient whose value range is 0≤k≤1, then the WLAN network is available;

2) when the average value of the signal strength of the WLAN access network within consecutive time segments of the predetermined number of times is greater than or not less than the predetermined threshold after the filtering process.

For example, when the average signal strength of the Probe Response measured by the UE within the second time segment is S2, the average signal strength of the Probe Response measured by the UE within the third time segment is S3, the predetermined number of times is 2 times, the predetermined threshold is Threshold1, and k multiplied by S2 plus (1−k) multiplied by S3 is greater than Threshold1, where k is the filtering coefficient whose value range is 0≤k≤1, then the WLAN network is available;

3) when the UE monitors that the signal strength of the WLAN access network within the predetermined number of consecutive times is higher than or not less than the predetermined threshold after the filtering process.

For example, the signal strength of the Beacon measured by the UE at the first time is S1, the signal strength of the Beacon measured by the UE at the second time is S2, the predetermined threshold is Threshold1, and k multiplied by S1 plus (1−k) multiplied by S2 is larger than Threshold1, where k is the filtering coefficient whose value range is 0≤k≤1, then the WLAN network is available;

"Filtering process" refers to weight and average a plurality of consecutively obtained values of one state, wherein the weighting coefficient of each value is called filtering coefficient, and the value range of the filtering coefficient is 0~1, including the boundary values.

When monitoring that the ratio of the received signal strength of the WLAN access network to the transmit signal strength of the WLAN access point within the predetermined time period or for the predetermined number of times is higher than or not less than the predetermined threshold after the filtering processing;

when monitoring that the SINR of the WLAN access network within the predetermined time period or for the predetermined number of times is higher than or not less than the predetermined threshold after the filtering processing;

when monitoring that the access network load of the WLAN access network within the predetermined time period or for the predetermined number of times is less than or not greater than the predetermined threshold after the filtering processing;

when monitoring that the uplink load of the link connecting the WLAN access network to the WAN within the predetermined time period or for the predetermined number of times is less than or no greater than the predetermined threshold after the filtering processing;

when monitoring that the downlink load in the link connecting the WLAN access network to the WAN within the predetermined time period or the predetermined number of times is less than or no greater than the predetermined threshold after the filtering processing;

when monitoring that any combination of the signal strength of the WLAN access network, the ratio of the received signal strength of the WLAN access network to the transmit signal strength of the WLAN access point, the SINR of signals in the WLAN access network, access network load of the WLAN access network, uplink load in the link connecting the WLAN access network to the WAN, and downlink load in the link connecting the WLAN access network to the WAN, is consistently higher than or not less than the predetermined threshold after the weighting process, or is consistently less than or not greater than the predetermined threshold within the predetermined time period and/or the predetermined number of times.

For example, at the first time the UE monitors that the ratio of the received signal strength of the WLAN access network to the transmit signal strength of the WLAN access point is D1, and at the first time, the UE monitors that the access network load of the WLAN access network is T1 within the predetermined time period, and the predetermined threshold is Threshold1, and (1−k) multiplied by D1 plus k multiplied by T1 is greater than Threshold1, wherein k is a weighting coefficient and −1≤k≤0, and at the second time, the UE monitors that the ratio of the received signal strength of the WLAN access network to the transmit signal strength of the WLAN access point is D2, and at the second time the UE monitors that the access network load of the WLAN access network is T2 within the predetermined time, and (1−k) multiplied by D2 plus k multiplied by T2 is greater than Threshold1, the predetermined number of times is 2, then the WLAN network is available;

For example, when the UE monitors that the signal strength of the WLAN access network is S2, the SINR of signals in the WLAN access network SINR2 is consistently higher than or not less than the predetermined threshold Threshold2 for the predetermined time period T2 after the weighting process, and within the T2 time period, it meets that a multiplied by S2 plus (1-a) multiplied by SINR2>Threshold2, where a is the weighting coefficient whose value range is 0≤a≤1;

when monitoring that any combination of the signal strength of the WLAN access network, the ratio of the received signal strength of the WLAN access network to the transmit signal strength of the WLAN access point, the SINR of signals in the WLAN access network, the access network load of the WLAN access network, the uplink load in the link connecting the WLAN access network to the WAN, and the downlink load in the link connecting the WLAN access network to the WAN within the predetermined time period or for the predetermined number of times is higher than or not less than the predetermined threshold, or less than or not greater than the predetermined threshold after the filtering processing and then the weighting processing, wherein the filtering and weighting methods are the same as described above.

After using the abovementioned preset condition to determine the available access network list, the UE selects the best WLAN access network therein and implements correlation and other processes.

Selecting the best WLAN access network may use the abovementioned method used for determining the available access network list, compare various states of the available WLAN access networks or the weighting values of the multiple states, and select the best one.

The Second Embodiment

Figure 3:
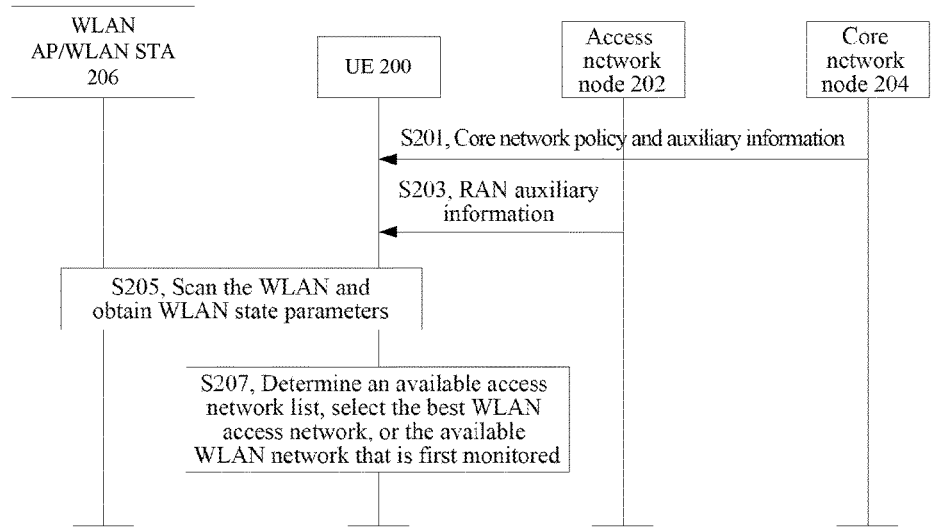
FIG. 3 is a schematic diagram of a flow chart of a first embodiment of the present invention.

FIG. 3 is a specific flow chart of the second embodiment of the present invention.

In step S301, the core network node (CN Node 304) sends the core network policy and auxiliary information to the user equipment (UE 300);

This step is the same as S201 and is not repeated.

In step S303, the access network node (RAN Node 302) sends the RAN control information to the UE 300;

wherein, the RAN control information comprises any combination of the following: a valid WLAN identification; a predetermined time value; a predetermined threshold value; a predetermined number of times; a weighting parameter value; a condition for selecting an available access network. Wherein the condition for selecting an available access network is the same as the conditions preset in S207.

In step S305, the UE 300 initiates WLAN scanning to obtain the WLAN state parameters;

This step is same as S205 and not repeated herein.

In step S307, the UE 300 determines the available access network list, selects the best WLAN access network, or selects the available WLAN access network that is monitored firstly;

the UE determines the available access network list according to the control information informed by the RAN node, the policy and auxiliary information informed by the CN node, as well as the state parameters of the WLAN network obtained in S305, and selects the best access network to implement the correlation and other process.

Selecting the best WLAN access network may use the abovementioned method used for determining the available access network list, compare different states of the available WLAN access networks or the weighting value of the various states, and select the best one.

The Third Embodiment

Figure 4:
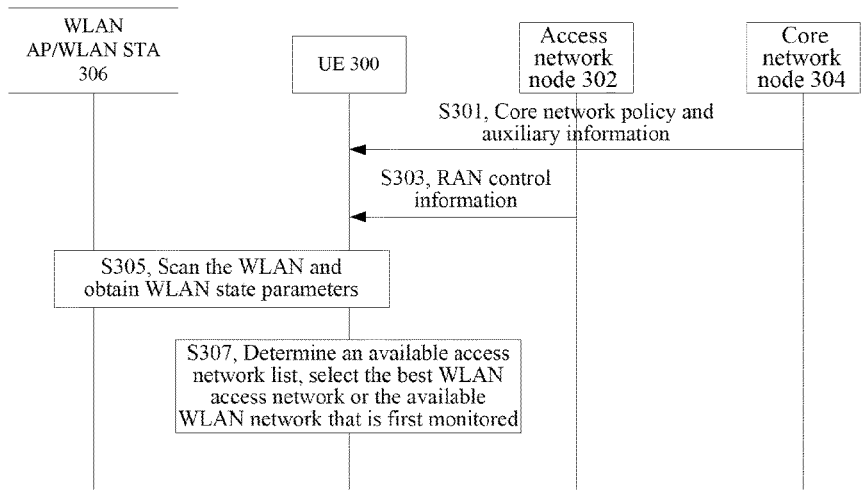
FIG. 4 is a schematic diagram of a flow chart of a second embodiment of the present invention.
Figure 5:
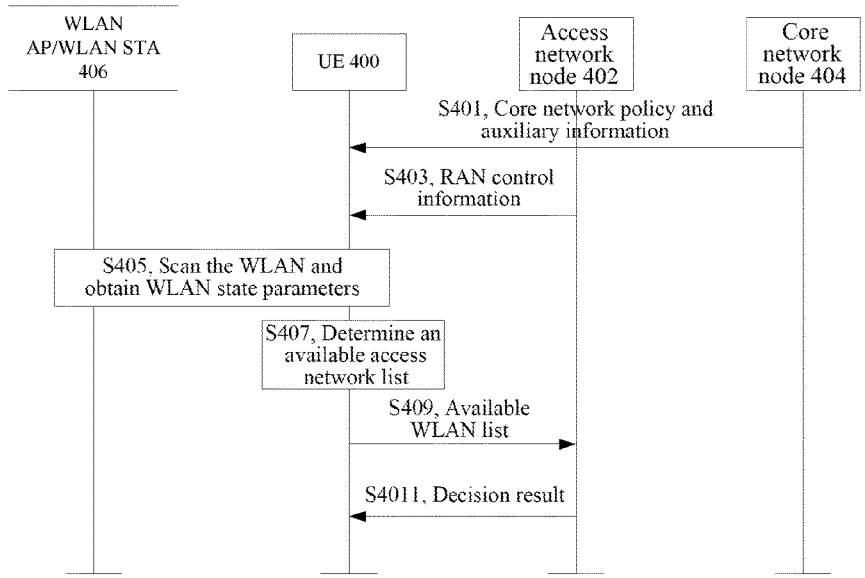
FIG. 5 is a schematic diagram of a flow chart of a third embodiment of the present invention.

FIG. 4 is a specific flow chart of the third embodiment of the present invention.

In step S401, the core network node (CN Node 404) sends the core network policy and auxiliary information to the user equipment (UE 400);

This step is the same as S201 and is not repeated.

In step S403, the access network node (RAN Node 402) sends the RAN control information to the UE 400;

this step is the same as the step S303 and is not repeated.

In step S405, the UE 400 initiates WLAN scanning to obtain the WLAN state parameters;

this step is the same as S205, and not repeated herein.

S407, the UE 300 determines the available access network list;

the UE determines the available access network list according to the control information informed by the RAN node, the policy and auxiliary information informed by the CN node, as well as state parameters of the WLAN network obtained in the step S305.

In step S409, the UE 400 sends the available access network list to the RAN Node 402;

the UE sends the determined available access network list to the RAN Node, and waits for the RAN Node making the final decision whether to allow the UE accessing to a certain WLAN network as well as to which WLAN network.

In step S4011, the RAN Node 402 sends the decision result to the UE 400;

the RAN Node uniformity plans that which UEs enter into a certain WLAN network, which UEs enter into another WLAN network, and which UEs do not access the WLAN, according to the available access network list obtained in the step S409, other UEs' available access lists received by itself, as well as some WLAN related auxiliary information obtained from other sources such as the WLAN AP of the common station or reported by the other UEs, and sends the final decision result to the UE.

This can avoid that multiple UEs simultaneously determining a certain WLAN network as the best one and simultaneously access the WLAN network, thus causing the WLAN network overloaded, so that these UEs cannot be served and return to the RAN, which affects the user experience and also wastes the resources and the UE energy.

In summary, the embodiments of the present invention ensure a UE selecting the appropriate WLAN network by the network side configuring the UE with a predetermined threshold and other parameters, as well as the condition for selecting an available access network or by the UE internally presetting the threshold and other parameters, and the condition for selecting the access network, thus improving the user experience, network resource utilization, and saving the UE energy.

Figure 6:
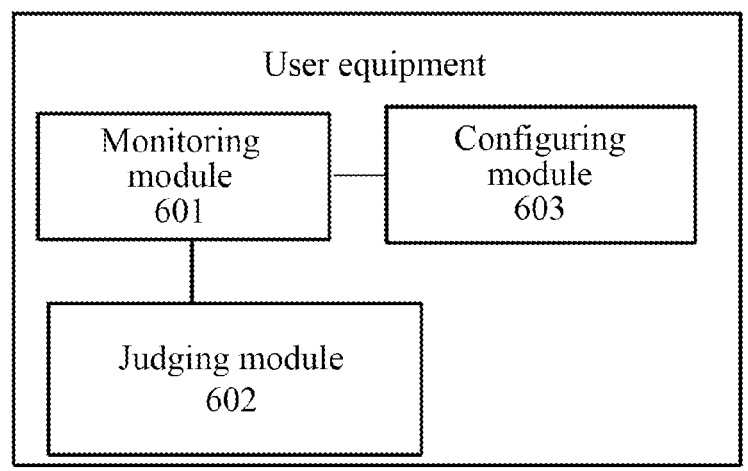
FIG. 6 is a schematic diagram of a user equipment in accordance with an embodiment of the present invention.

FIG. 6 is a schematic diagram of a user equipment in accordance with an embodiment of the present invention, and as shown in FIG. 6, the user equipment in the present embodiment comprises:

a monitoring module 601, which is configured to monitor whether the state of a WLAN access network consistently meets a predetermined threshold for a predetermined time period and/or a predetermined number of times, or monitor whether the state of the WLAN access network within the predetermined time period or for the predetermined number of times meets the predetermined threshold after a filtering process; and a judging module 602, which is configured to determine the WLAN access network as an available access network in the case that the monitoring module monitors that the predetermined condition is met.

In one preferred embodiment, the monitoring module 601 monitors whether the state of the WLAN access network meets the predetermined threshold within the predetermined time period and/or the predetermined number of times in the following way: monitoring whether one or more states of the WLAN access network respectively and consistently meet the predetermined threshold, or whether multiple states of the WLAN access network consistently meet the threshold after the weighting processing, or whether any one state of the multiple states consistently meets the predetermined threshold for the predetermined time period and/or the predetermined number of times.

In one preferred embodiment, the monitoring module 601 monitors whether the state of the WLAN access network within the predetermined time period or for the predetermined number of times meets the predetermined threshold after the filtering process in the following way: monitoring whether the average value of the state of the WLAN access network within a plurality of time segments of the predetermined time period meets the predetermined threshold after the weighting processing; or, monitoring whether the average value of the state of the WLAN access network within consecutive time segments of the predetermined number of times meets the predetermined threshold after the weighting processing; or, monitoring whether the state of the WLAN access network within the predetermined number of consecutive times meets the predetermined threshold after the weighting processing.

In one preferred embodiment, the monitoring module 601 monitors whether the state of the WLAN access network within the predetermined time period or for the predetermined number of times meets the predetermined threshold after the filtering processing in the following way: monitoring whether the multiple states of the WLAN access network within the predetermined time period or for the predetermined number of times respectively meet the predetermined threshold after the filtering processing, or meet the predetermined threshold after the filtering processing and then the weighting processing, or whether any one state of the multiple states meets the predetermined threshold after the filtering process.

Wherein, the state of the WLAN access network monitored by the monitoring module 601 comprises one or more of the following:

the signal strength of the WLAN access network;

the ratio of the received signal strength of the WLAN access network to the transmit signal strength of the WLAN access point;

the signal to interference and noise ratio of the signals in the WLAN access network;

the access network load of the WLAN access network;

the uplink load of the link connecting the WLAN access network to the WAN; and the downlink load of the link connecting the WLAN access network to the WAN.

Wherein, the monitoring module 601 obtains the signal strength of the WLAN access network by measuring the beacon frame or the measurement pilot frame, or by a replied beacon report or link measurement report obtained after sending a beacon request or a link measurement request to the WLAN station; obtains the ratio of the received signal strength of the WLAN access network to the transmit signal strength of the WLAN access point by monitoring the beacon frame or the probe response frame as well as the known signal strength of the WLAN access network; obtains the signal to interference and noise ratio of signals in the WLAN access network by measuring the beacon frame or the measurement pilot frame, or by a replied link measurement report obtained after sending a link measurement request to the WLAN station, or a replied noise histogram report obtained after by sending a noise histogram request to the WLAN station, as well as the known signal strength of the WLAN access network; obtains the access network load of the WLAN access network by monitoring the beacon frame or the probe response frame, or by a replied channel load report obtained after sending a channel load request to the WLAN and receiving; and obtains the uplink load of the link connecting the WLAN access network to the WAN and the downlink load of the link connecting the WLAN access network to the WAN by monitoring the beacon frame or the probe response frame.

Wherein, the user equipment can further comprise, a configuration module 603, which is configured to accept the predetermined threshold, the predetermined time period, the predetermined number of times, the filtering coefficient of the filtering process configured by the network side via broadcasting or paging or the dedicated signaling or configured by itself in accordance with the protocol specification.

Obviously, those skilled in the art should understand that, each abovementioned module or step of the patent document can be achieved with a general-purpose computing device, and they can be integrated on a single computing device or distributed in a network composed of a plurality of computing devices, alternatively, they may be implemented with program codes executable by a computing device, so that they can be stored in a storage apparatus and executed by a computing device, or they can be made into separate integrated circuit modules, or some of the modules or steps therein can be made into a single integrated circuit module to implement. Thus, the patent document is not limited to any specific combination of hardware and software.

The above description is only preferred embodiments of the present invention and not intended to limit the patent document, and for a person in the field, the patent document can have various modifications and changes. Any, modifications, equivalent replacements and improvements made within the spirit and principle of the patent document should be included within the scope of the claims of the patent document.

INDUSTRIAL APPLICABILITY

The embodiment of the present invention provides a method for selecting an available access network and a user equipment to ensure that the UE selects a stable wireless local area network access network, thus reducing the risk of possible ping-pong selection.

We claim:

1. A method for selecting an available access network, comprising:

access network node sending a predetermined threshold and a condition for selecting the available access network to a user equipment, UE, wherein the condition for selecting the available access network comprises a state of a wireless local area network, WLAN, access network consistently meets the predetermined threshold for a predetermined time period and/or a predetermined number of times, or the state of the WLAN access network within the predetermined time period or for the predetermined number of times meets the predetermined threshold after filtering processing;

when the UE monitoring that the state of the WLAN access network which comprises an uplink load of a link connecting the WLAN access network to a wide area network, WAN, and/or, a downlink load of the link connecting the WLAN access network to the WAN consistently meets the predetermined threshold for the predetermined time period and/or the predetermined number of times, or monitoring that the state of the WLAN access network which comprises the uplink load of the link connecting the WLAN access network to the WAN, and/or, the downlink load of the link connecting the WLAN access network to the WAN within the predetermined time period or for the predetermined number of times meets the predetermined threshold after filtering processing, the UE determining the WLAN access network as the available access network.

2. The method of claim 1, wherein,

The UE monitoring that the state of a WLAN access network consistently meets the predetermined threshold for the predetermined time period and/or the predetermined number of times comprises:

the UE monitoring that one or more states of the WLAN access network respectively and consistently meet the predetermined threshold, or a plurality of states of the WLAN access network consistently meet the predetermined threshold after weighting processing, or any one state of the plurality of states consistently meets the predetermined threshold for the predetermined time period and/or the predetermined number of times.

3. The method of claim 1, wherein, the UE monitoring that the state of the WLAN access network within the predetermined time period or for the predetermined number of times meets the predetermined threshold after filtering processing comprises:

the UE monitoring that an average value of the state of the WLAN access network within a plurality of time segments of the predetermined time period meets the predetermined threshold after weighting processing;

or, the UE monitoring that an average value of the state of the WLAN access network within consecutive time segments of a predetermined number of times meets the predetermined threshold after the weighting processing;

or, the UE monitoring that the state of the WLAN access network within a predetermined number of consecutive times meets the predetermined threshold after the weighting processing.

4. The method of claim 1, wherein, the UE monitoring that the state of the WLAN access network within the predetermined time period or for the predetermined number of times meets the predetermined threshold after filtering processing comprises:

the UE monitoring that a plurality of states of the WLAN access network within the predetermined time period or for the predetermined number of times respectively meet the predetermined threshold after the filtering processing, or meet the predetermined threshold after the filtering processing and then weighting processing, or any one state of the plurality of states meets the predetermined threshold after the filtering processing.

5. The method of claim 1, wherein, the state of the WLAN access network also comprises one or more of the following:

an access network load of the WLAN access network;

signal strength of the WLAN access network;

a ratio of a received signal strength of the WLAN access network to a transmit signal strength of the WLAN access point;

a signal to interference and noise ratio (SINR) of signals in the WLAN access network.

6. The method of claim 5, wherein:

the UE obtains the signal strength of the WLAN access network by measuring a beacon frame or a measurement pilot frame, or by a replied beacon report or link measurement report obtained after sending a beacon request or a link measurement request to a WLAN site;

the UE obtains the ratio of the received signal strength of the WLAN access network to the transmit signal strength of the WLAN access point by monitoring the beacon frame or a probe response frame as well as the known signal strength of the WLAN access network;

the UE obtains the signal to interference and noise ratio (SINR) of signals in the WLAN access network by measuring the beacon frame or the measurement pilot frame, or a replied link measurement report obtained after sending a link measurement request to the WLAN site, or a replied noise histogram report obtained after sending a noise histogram request to the WLAN site as well as the known signal strength of the WLAN access network;

the UE obtains the access network load of the WLAN access network by monitoring the beacon frame or the probe response frame, or by a replied channel load report obtained after sending a channel load request to the WLAN site; and the UE obtains the uplink load of the link connecting the WLAN access network to the WAN and the downlink load of the link connecting the WLAN access network to the WAN by monitoring the beacon frame or the probe response frame.

7. The method of claim 1, wherein:

the predetermined threshold is configured by a network side via broadcasting or paging or a dedicated signaling, or is configured by the UE self in accordance with a protocol specification.

8. The method of claim 1, wherein:

the predetermined time period is configured by a network side via broadcasting or paging or a dedicated signaling, or is configured by the UE self in accordance with a protocol specification.

9. The method of claim 1, wherein:

the predetermined number of times is configured by a network side via broadcasting or paging or a dedicated signaling, or is configured by the UE self in accordance with a protocol specification.

10. The method of claim 1, wherein:

a filtering coefficient of the filtering processing is configured by a network side via broadcasting or paging or a dedicated signaling, or is configured by the UE self in accordance with a protocol specification.

11. The method of claim 2, wherein:

a weighting coefficient of the weighting processing is configured by a network side via broadcasting or paging or a dedicated signaling, or is configured by the UE self in accordance with a protocol specification.

12. A user equipment, UE, comprising:

a monitoring module, configured to monitor whether a state of a wireless local area network, WLAN, access network which comprises an uplink load of a link connecting the WLAN access network to a wide area network, WAN, and/or, a downlink load of the link connecting the WLAN access network to the WAN consistently meets a predetermined threshold for a predetermined time period and/or a predetermined number of times, or monitor whether the state of the WLAN access network which comprises the uplink load of the link connecting the WLAN access network to the WAN, and/or, the downlink load of the link connecting the WLAN access network to the WAN within the predetermined time period or for the predetermined number of times meets the predetermined threshold after filtering processing; and a judging module, configured to determine the WLAN access network as the available access network in the case that the monitoring module monitors that a condition for selecting the available access network is met, wherein the condition for selecting the available access network comprises the state of the WLAN access network consistently meets the predetermined threshold for a predetermined time period and/or the predetermined number of times, or the state of the WLAN access network within the predetermined time period or for the predetermined number of times meets the predetermined threshold after filtering processing;

wherein the predetermined threshold and the condition for selecting the available access network are sent from the access network node.

13. The UE of claim 12, wherein:
the monitoring module monitors whether the state of the WLAN access network meets a predetermined threshold for a predetermined time period and/or a predetermined number of times in the following way:
monitoring whether one or more states of the WLAN access network respectively and consistently meet the predetermined threshold for the predetermined time period and/or the predetermined number of times, or whether a plurality of states of the WLAN access network consistently meet the predetermined threshold for the predetermined time period and/or the predetermined number of times after weighting processing, or whether any one state of the plurality states consistently meets the predetermined threshold for the predetermined time period and/or the predetermined number of times.

14. The UE of claim 12, wherein:
the monitoring module monitors whether the state of the WLAN access network meets within the predetermined time period or for the predetermined number of times meets the predetermined threshold after filtering processing in the following way:
monitoring whether an average value of the state of the WLAN access network within a plurality of time segments of the predetermined time period meets the predetermined threshold after weighting processing; or, monitoring whether an average value of the state of the WLAN access network within consecutive time segments of a predetermined number of consecutive times meets the predetermined threshold after the weighting processing; or, monitoring whether the state of the WLAN access network for the predetermined number of consecutive times meets the predetermined threshold after the weighting processing.

15. The UE of claim 12, wherein:
the monitoring module monitors whether the state of the WLAN access network within the predetermined time period or for the predetermined number of times meets the predetermined threshold after filtering processing in the following way:
monitoring whether a plurality of states of the WLAN access network within the predetermined time period or for the predetermined number of times respectively meet the predetermined threshold after the filtering processing, or whether a plurality of states of the WLAN access network within the predetermined time period or for the predetermined number of times respectively meet the predetermined threshold after the filtering processing and then weighting processing or not, or whether any one state of the plurality of states meets the predetermined threshold after the filtering processing.

16. The UE of claim 12, wherein, the state of the WLAN access network monitored by the monitoring module also comprises one or more of the following:
an access network load of the WLAN access network;
signal strength of the WLAN access network;
a ratio of a received signal strength of the WLAN access network to a transmit signal strength of the WLAN access point;
a signal to interference and noise ratio (SINR) of signals in the WLAN access network.

17. The UE of claim 16, wherein, the monitoring module monitors the state of the WLAN access network through one or more of the following way:
obtaining the signal strength of the WLAN access network by measuring a beacon frame or a measurement pilot frame, or by a replied beacon report or link measurement report obtained after sending a beacon request or a link measurement request to a WLAN site;
obtaining the ratio of the received signal strength of the WLAN access network to the transmit signal strength of the WLAN access point by monitoring the beacon frame or a probe response frame as well as the known signal strength of the WLAN access network;
obtaining the signal to interference and noise ratio (SINR) of signals in the WLAN access network by measuring the beacon frame or the measurement pilot frame, or a replied link measurement report obtained after sending a link measurement request to the WLAN site, or a replied noise histogram report obtained after sending a noise histogram request to the WLAN site as well as the known signal strength of the WLAN access network;
obtaining the access network load of the WLAN access network by monitoring the beacon frame or the probe response frame, or by a replied channel load report obtained after sending a channel load request to the WLAN site; and
obtaining the uplink load of the link connecting the WLAN access network to the WAN and the downlink load of the link connecting the WLAN access network to the WAN by monitoring the beacon frame or the probe response frame.

18. The UE of claim 12, further comprising,
a configuring module, configured to accept one or more of the following parameters: the predetermined threshold, the predetermined time period, the predetermined number of times, a filtering coefficient of the filtering processing and a weighting coefficient of the weighting processing set by a network side via broadcasting or paging or a dedicated signaling, or set by the configuring module self in accordance with a protocol specification.

19. The UE of claim 13, further comprising,
a configuring module, configured to accept one or more of the following parameters: the predetermined threshold, the predetermined time period, the predetermined number of times, a filtering coefficient of the filtering processing and a weighting coefficient of the weighting processing set by a network side via broadcasting or paging or a dedicated signaling, or set by the configuring module self in accordance with a protocol specification.

20. The UE of claim 14, further comprising,
a configuring module, configured to accept one or more of the following parameters: the predetermined threshold, the predetermined time period, the predetermined number of times, a filtering coefficient of the filtering processing and a weighting coefficient of the weighting processing set by a network side via broadcasting or paging or a dedicated signaling, or set by the configuring module self in accordance with a protocol specification.

* * * * *